March 9, 1937.   J. O. ALMEN ET AL   2,073,134
FRICTION TRANSMISSION CONTROL MECHANISM
Filed May 7, 1936   5 Sheets-Sheet 2

Inventors
John O. Almen &
Winfield D. Gove
By Blackmore, Spencer & Flint
Attorneys March 9, 1937.　　　J. O. ALMEN ET AL　　　2,073,134
FRICTION TRANSMISSION CONTROL MECHANISM
Filed May 7, 1936　　　5 Sheets-Sheet 3

Inventors
John O. Almen &
Winfield D. Gove
By Blackmore, Spencer & Flint
Attorneys March 9, 1937. J. O. ALMEN ET AL 2,073,134
FRICTION TRANSMISSION CONTROL MECHANISM
Filed May 7, 1936  5 Sheets-Sheet 5

Inventors
John O. Almen &
Winfield D. Gove

Patented Mar. 9, 1937

2,073,134

UNITED STATES PATENT OFFICE 2,073,134

FRICTION TRANSMISSION CONTROL MECHANISM

John O. Almen, Royal Oak, Mich., and Winfield D. Gove, West Hartford, Conn., assignors to General Motors Corporation, Detroit, Mich., a corporation of Delaware Application May 7, 1936, Serial No. 78,310

16 Claims. (Cl. 74—200)

This invention relates to frictional power transmission mechanisms of race and roller type equipped with separate control means for forward and reverse driving.

The object of the invention is to automatically set the control means for either forward or reverse driving in response to changes in the sense of rotation of the output shaft.

The invention is an improvement over that disclosed and claimed in application Serial No. 758,394, filed December 20, 1934 now Patent No. 2,045,558. The improvement consists primarily in simplified means disposed between, on the one hand, a reversing clutch that responds to changes in sense of rotation of some element that changes synchronously with the output shaft and, on the other, the forward and reverse-driving ratio control elements attached to the roller carriers, whereby either the forward or reverse-driving control elements will be automatically set to correspond with the sense of rotation of the output shaft.

In the accompanying drawings in which like reference characters indicate like parts throughout the several views—

The invention is illustrated as applied to a duplex friction race and roller transmission mechanism designed to be disposed abaft the rear axle of a motor vehicle and to be operated from an engine mounted forward of said axle. The effort of the engine is applied to the transmission through an input shaft geared to the driving race or races and offset from the power output shaft, which is coaxial with the races and, from its forward end, drives the rear axle shaft. The invention is not limited however to the particular arrangement shown.

In the drawings numeral 16 indicates a transmission casing and supporting means for housing and supporting a duplex power transmitting mechanism including two sets of races with opposed toroidal raceways and interposed rollers for transmitting rotation from one race of each set to the other race of the same set. The two sets constitute branches through which the divided input torque is caused to be transmitted in parallel to the point of output.

Fixed within the casing is an inner supporting and strengthening frame comprising separated, parallel transverse frame members or spiders 17, 17a rigidly united by a curved web 18. The members 17 and 17a are centrally perforated to receive a frame-tube or spider-tube rigidly secured to them. This frame or spider-tube extends forward and rearward of the frame members 17, 17a. It is of composite structure and specialized in function as will be fully explained hereinafter.

Each of the frame members 17 and 17a has a plurality of openings 20 and 20a, respectively, arranged around the center for admitting the before-mentioned transmission rollers that are interposed between the toroidal races. The rollers are supported in carriers attached to the supporting members 17, 17a by means to be described.

Figures 5, 6:
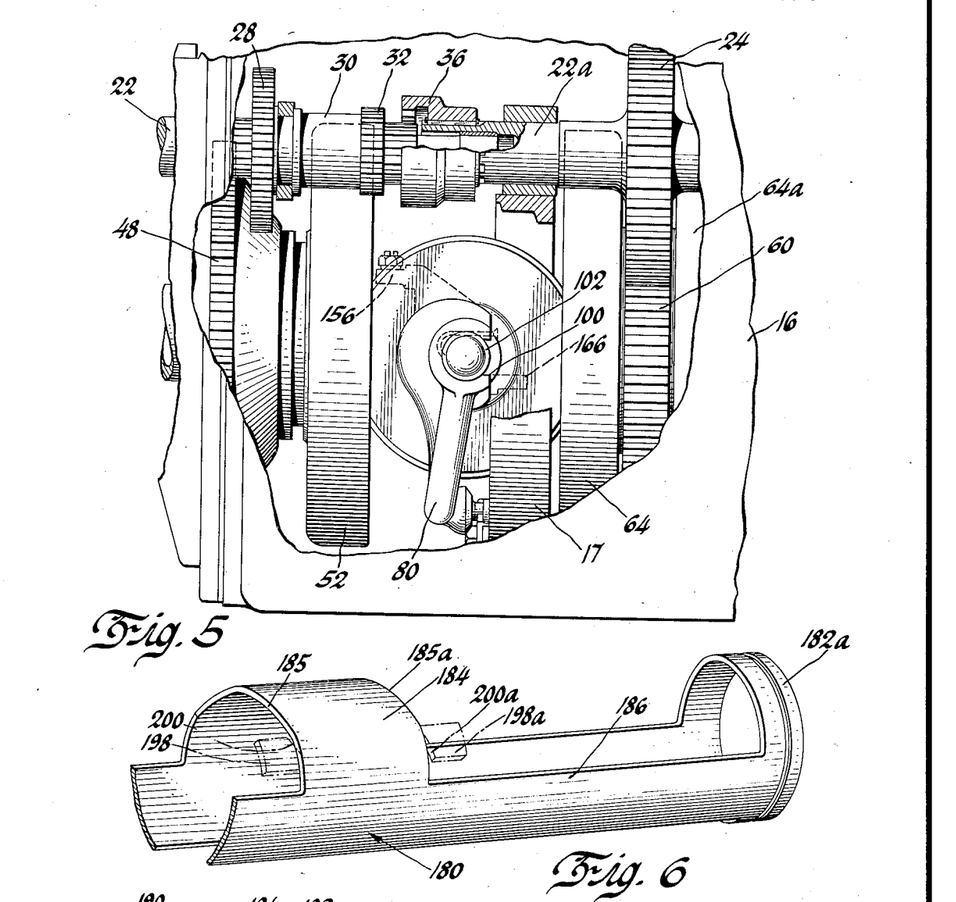
Figure 5 is a side elevation showing the transmission casing broken away in part and exposing the enclosed transmission mechanism partly in section.
Figure 6 is a perspective view of the reversing slider, constituting a part of the setting means for the roller control mechanism.

Input shaft section 22, designed to transmit the power of an engine, not shown, to the transmission mechanism, enters the front end of casing 16. It is assumed to rotate clockwise viewed from the front,—that is, from the left of Figs. 1 and 5. The rear end of shaft section 22 is reduced and piloted in a bore in the front end of a continuation power input shaft section 22a, as shown in Figure 5, said shaft-section 22a being rotatable in suitable bearings in frame members 17, 17a, and carrying a driving gear 24 fixed thereto between the bearings. A hollow cylindrical clutch member 36 having internal gear-like clutch teeth is secured to shaft section 22a and overhangs the rear end of shaft section 22. A reverse driving gear 28, having an integral or rigidly united hub-like sleeve 30 equipped on its rear end with a clutch member 32 provided with external gear-like clutch teeth adapted to interlock with the corresponding internal teeth of clutch member 36, is slidably splined to shaft section 22.

The output shaft of the transmission mechanism is indicated by numeral 40. The front end of shaft 40 is supported in a bearing 42 seated in the front wall 44 of casing 16. Forward of bearing 42 shaft 40 carries a bevel pinion 46 designed to mesh with the ring gear of a rear axle differential gearing (not shown). A reverse gear 48 is mounted to rotate with shaft 40 and is adapted to be intermeshed with gear 28 previously described as slidably keyed to input shaft section 22. Shaft 40 extends through the frame-tube mentioned and certain other surrounding control elements to be described. At its rear end the frame-tube is fitted with a suitable bearing bushing in contact with the shaft 40 which is out of contact with the surrounding parts between said bushing and an oil seal at the front end.

During forward driving, power is transmitted from the input shaft 22, 22a, through gear 24 to the power output shaft 40 by means to be now described.

Toroidal races 52 and 52a, disposed respectively at front and rear within the casing 16, are mounted concentrically with shaft 40 so that shaft and races are compelled to rotate together.

Figure 1:
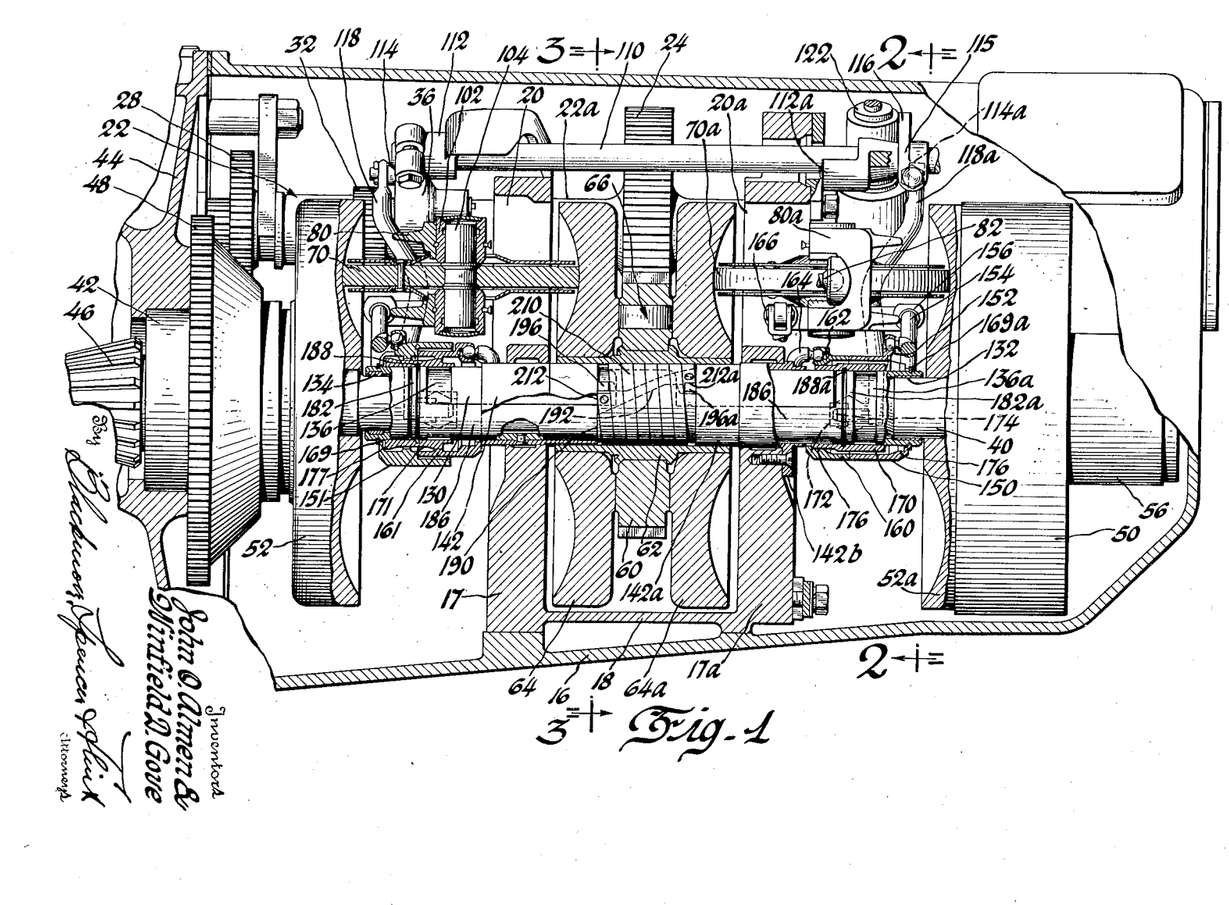
Figure 1 is a view, partly in longitudinal section, of a casing and inclosed transmission mechanism embodying this invention.

Gear 24 on input shaft section 22a meshes with a gear 60 secured to a tubular hub-like member 62, having a central bore and projecting both fore and aft of the gear 60, as shown in Fig. 1. The inner peripheries of the projecting portions of hub-like member 62 have bearing contact with the frame-tube previously mentioned, their outer peripheries serving as bearings on which the toroidal driving races 64 and 64a are mounted. The latter named races are preferably rotated by gear 60 through balanced or differential devices such as rollers seated in slots in said gear and rotatable about radial axes, one of said devices being indicated at 66 in Figure 1. Races 64, 64a and gear 60, may, however, be maintained in power transmitting engagement by any suitable means.

Power transmitting rollers are interposed between the driving and driven races of each half of the transmission. Preferably there are a set of three rollers 70 between driving race 64 and driven race 52 and another set of three rollers 70a between driving race 64a and driven race 52a. The carriers in which the rollers are mounted cannot revolve about the axis of the output shaft, but are anchored on the frame work of the transmission so as to allow the rollers to incline about axes joining their points of contact with the races and to tilt so as to change their tracks on the races.

As is usual in race and roller transmission mechanism of the type shown the races may be adjusted axially with respect to one another in such manner as to squeeze the rollers between them in order to produce that degree of traction which is necessary in order to move the load. The required pressure is intended to be applied by spring and torque loading devices of any suitable construction. The loading devices are not shown in the drawings as they are concealed within the flange 50 and cover 56 which rotate with the race 52a, and are fully disclosed and claimed in Patent No. 2,030,203, dated February 11, 1936.

Suitable carriers for supporting and positioning rollers 70, 70a, respectively, are indicated by numerals 80, 80a. The carriers are similar except that the carriers for one set are lefts and of the other rights. A description of one carrier will therefore suffice for all.

Each carrier 80, 80a is forked or U-shaped, having parallel limbs with ends free or separated one from the other. Each carrier is moored to a supporting member (17 or 17a) by a universal joint indicated by numeral 82, connected to one face of the member 17 (or 17a) near the outer edge of the latter and to the carrier at the end from which the two limbs of the forked carrier diverge, which will here be designated the base of the carrier. Each supporting member 17, 17a is disposed as shown between a driving and a driven race, and each carrier is moored to its supporting member so that the roller mounted in said carrier may rotate, incline, or tilt within one of the openings 20, 20a.

The rollers 70 and 70a are secured to axles or arbors 104 which are journaled in bearing bushings 102 seated in open-sided recesses 100 in the limbs of the forked carriers near their ends. Each roller is mounted in its carrier so that the limbs of the latter may have a limited freedom of movement on the arbors 104 toward and from the center plane of the roller, this relative movement inclining the roller slightly about an axis joining its points of contact with the races.

The two limbs of each forked carrier are disposed with open-sided recesses or gaps 100 opening toward the driving race. Each roller center and center of the joint by which its carrier is moored lie substantially in a plane normal to the axis of output shaft 40. That surface of the carrier (having the gaps 100) which faces the driving race is deemed to be the front of the carrier. That surface of the carrier which is adjacent to a driven race is deemed to be the back. Each carrier may rotate and swing in any direction about the center of the universal mooring joint except as restrained by limitations on the movements of the roller journalled in it. In the mechanism described and shown the tangential driving force of a driving race on a roller and the tangential reaction force between a driven race and said roller during forward driving are exerted in a direction from the mooring joint through the roller center so as to cause the carrier to "trail." This will be apparent from inspection, since the output shaft during forward driving rotates clockwise viewed from the left of Figures 1 and 5.

In the transmission mechanism illustrated, rearward or reverse driving is effected by disconnecting clutch jaws 26 and 32 and by meshing reverse gears 28 and 48, thereby shunting out, or by-passing the race and roller mechanism as means for transmitting torque, and driving output shaft 40 by a gear connection from input shaft section 22. During reverse driving obviously the races 52 and 52a, which rotate clockwise during forward driving (as viewed from the left of Figs. 1 and 5) when they transmit the power of the engine to the output shaft 40, now rotate counter clockwise and deliver no torque except what is necessary to rotate the rollers 70, 70a, races 64, 64a, gears 60 and 24 which now rotate idly.

During reverse driving, although there is no substantial load resisting rotation of rollers, races, and gears 60 and 24, yet such tangential forces as are exerted by the races upon the rollers are also in a direction to cause the carriers to "trail" as described with respect to forward driving.

The mechanism thus far described is not claimed herein and is disclosed substantially and claimed in U. S. Patent No. 2,014,928, dated September 17, 1935.

Figure 2:
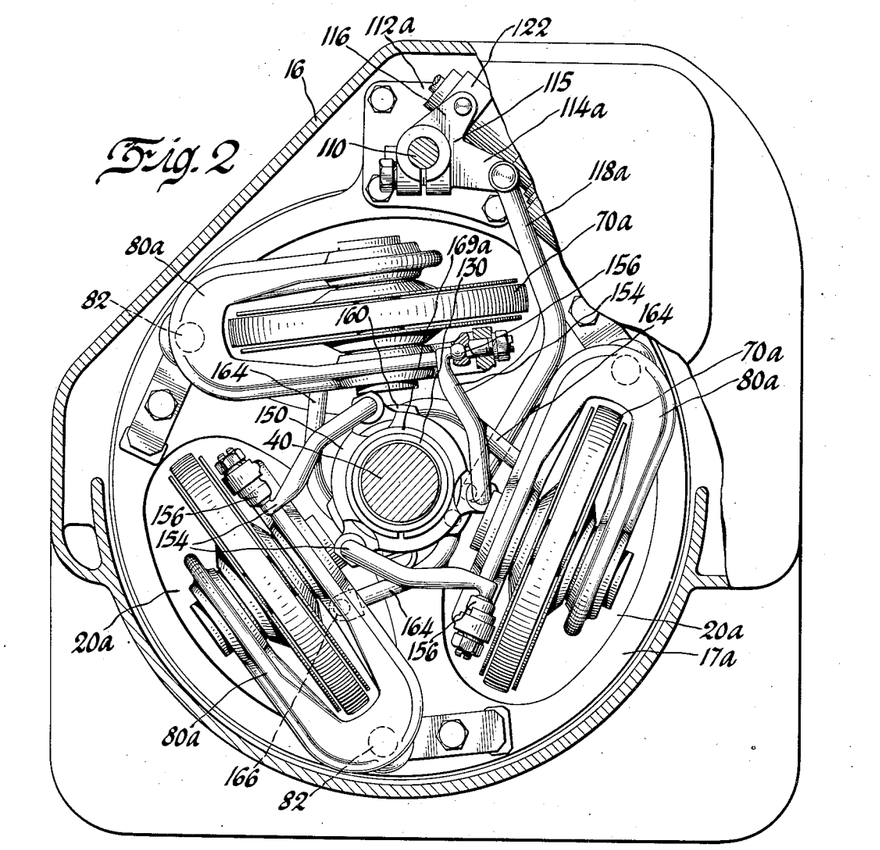
Figure 2 is a transverse sectional view taken along the line 2—2 in Figure 1.
Figure 3:
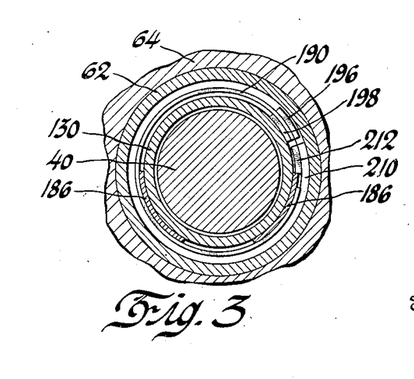
Figure 3 is a transverse sectional view taken along line 3—3 of Figure 1.
Figure 4:
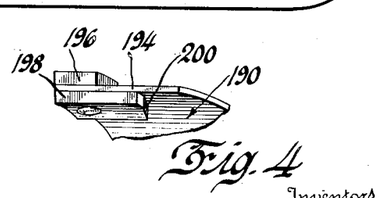
Figure 4 is a perspective view of a fragment of the reversing slider actuator sleeve constituting a part of the setting means for the roller control mechanism.

In Figs. 1 and 2 numeral 110 indicates a control shaft disposed radially outward of the friction races and rollers and parallel with the axis of shaft 40, which is the main axis of the transmission mechanism. Shaft 110 is supported in a bearing bracket 112 attached to member 17 and in a bearing bracket 112a attached to member 17a. The ends of shaft 110 extend through the bearings. To the forward end is secured an arm 114 and to the rearward end a bell crank lever 115, having one arm 114a, corresponding to the arm 114 on the forward end, and also an arm 116. A master control link 118 is pivoted to forward arm 114, and a similar link 118a is pivoted to rearward arm 114a. Master control links 118, 118a transmit motion from control shaft 110, when it is rocked, to trains of intermediate mechanism between said links and the roller carriers in order to effect a change in ratio position of the rollers. Rocking movement may be imparted to the control shaft by means of direct connection with a handle, pedal, governor or the like, or by an indirect connection therewith through a suitable servo mechanism. In the drawings arm 116 is shown connected to the output element 122 of a servo mechanism, which may be of the type shown in application Serial No. 4,220 filed January 31, 1935 now Patent No. 2,045,559. For the purpose of this invention it is sufficient to state that in response to an operator's muscular effort, or to automatic governor effort, the servo mechanism is brought into operation and imparts axial movement to the servo output element 122, which moves arm 116, thus rocking the shaft 110 and the arms 114, 114a, secured to its opposite ends, in one sense or the opposite according to whether a shift to high or low ratio is contemplated.

The intermediate mechanism between the master links 118, 118a and the roller carriers comprises automatically shiftable master coupling rings arranged to be moved angularly by the master links 118, 118a to which respectively they are suitably connected; two ratio control elements such as collars associated with each master coupling ring, either of which collars may be interlocked with said master coupling ring; and links connecting the control collars to the carriers. Rotation of one ratio control collar at each end shifts the rollers toward high or low ratio position when the transmission is in forward driving condition, and rotation of the other ratio control collar at each end effects similar ratio changes when the transmission is in reverse. The shifting or re-setting of the master control rings in order to lock them with the forward-drive ratio control collars or with the reverse-drive ratio control collars is accomplished automatically in response to changes in the sense of rotation of the gear 60 and the hub-like member 62 on which said gear is secured. This automatically controlled re-setting mechanism, which operates when the output shaft changes the sense of rotation, will be described presently.

The frame or spider-tube, previously mentioned, which passes through the frame members 17 and 17a and surrounds the shaft 40 is indicated by the numeral 130. As best shown in Fig. 1, this frame-tube is of uniform internal diameter except for a slight enlargement at the rear end to receive the bushing 132 within which shaft 40 turns, and a circumferential groove within the front end to receive an oil-seal ring 134. The tube is slightly spaced from shaft 40 between the bushing 132 and the oil-seal ring 134 to provide an annular space for the free passage of lubricating oil.

Figure 13:
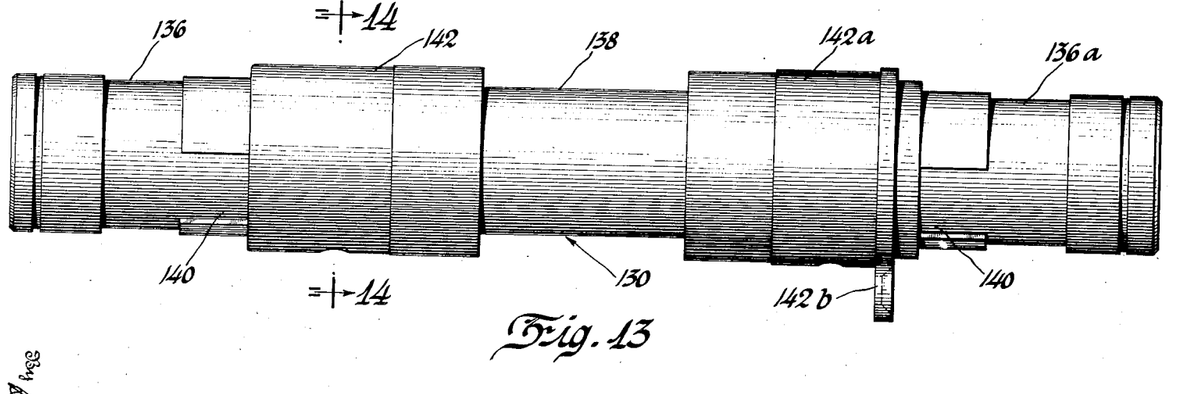
Figure 13 is an elevation of a frame tube.
Figure 14:
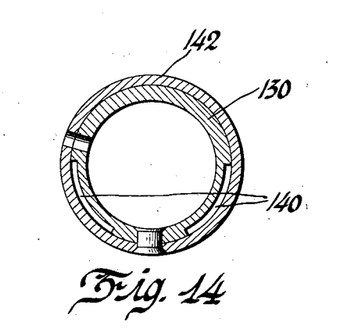
Figure 14 is a section on line 14—14 of Figure 13.

As shown clearly in Fig. 13, frame-tube 130 is reduced in external diameter near its ends to form cylindrical channels as indicated at 136 and 136a to accommodate the ring-like ends of a reversing slider to be presently described. It is also reduced in external diameter to provide a wide annular space or channel midway of its length as indicated at 138. This wide channel 138 accommodates an automatic reversing clutch mechanism (to be described) that responds directly to change in sense of rotation of the gear 60 and hub-like tube 62 substantially synchronously with changes in the sense of rotation of the output shaft. Machined in the exterior of tube 130 are longitudinal guideways 140 to accommodate and guide the said reversing slider. Two reinforcing tubular bodies 142 and 142a surround tube 130 and are riveted or otherwise secured to it. These reinforcing tubular bodies bridge over the longitudinal guideways 140, as shown in Figs. 1, 13 and 14, and help to guide the reversing slider. Tubular body 142a has a projecting lug or ear 142b perforated to permit the passage of a threaded bolt or screw into frame member 17a in order to secure together frame members 17, 17a and 18, and said frame-tube. The adjacent end portions of reinforcing tubes 142 and 142a serve as bearings for the ends of hub-like tube 62 which telescopes over said ends as shown in Fig. 1.

Forward driving, cupped control-collar 150 at the rear of the transmission casing is formed with three lugs 152 (Figs. 1 and 9), each having at the rear side a ball socket to receive the ball end of a link 154, the other end of each of said links having a universal joint connection at 156 with a bracket projecting from the back of one limb of a forked carrier 80a. If during forward-driving collar 150 be rocked clockwise as viewed in Figure 2 the carriers will be adjusted so as to steer the rollers 70a on race 64a toward a higher speed ratio position; if it be rocked counter-clockwise adjustment will be made toward a lower speed ratio position.

Reverse driving, cupped control-collar 160 (at the rear of the transmission casing) is also formed with three lugs 162 each having a ball socket at the front side to receive the ball end of a link 164, the other end of each of which has a universal joint connection at 166 with a bracket projecting from the front side of a carrier 80a. If, during reverse driving, collar 160 be rocked clockwise the rollers 70a will be steered outward on race 64a, which is now rotating in the reverse direction—counter clockwise as viewed in Figure 2; and if said collar be rocked counter-clockwise said rollers will be steered inward on said race.

It is thus apparent that a given rotary movement of control shaft 110 will adjust the rollers into similar angular positions with respect to the races whether the races and rollers are being rotated for forward or reverse driving.

Figure 9:
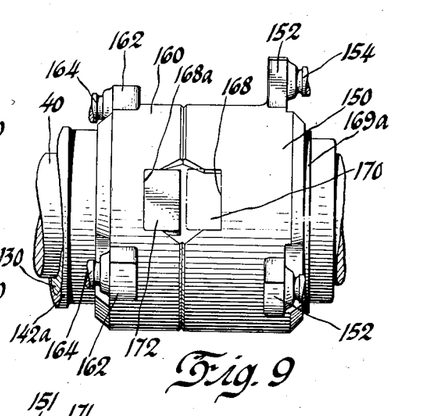
Figure 9 shows an assembly of control parts at the rearward end of the transmission mechanism.

As best shown in Figure 9, cup-like collars 150 and 160 have abutting edges and rectangular notches 168, 168a with tapering entrances disposed at diametrically opposite locations, the notches in one collar registering substantially with those in the other and serving as clutching recesses cooperating with coacting clutch dogs on the master control ring to be now described. Said collars are disposed between the rear end of tubular body 142a and a stop ring 169a seated in a groove in the frame-tube 130 near its rear and are thus prevented from moving axially.

The master control ring at the rear end of the transmission casing is indicated by numeral 170. Diametrically opposite dogs 172 project radially into the notches 168 or 168a of one or the other of collars 150 or 160 according to whether the transmission is to be driven forward or backward. One of the dogs 172 is perforated to receive a pin 174 fixed to the end of link 118a so that movement of the link in response to a rocking movement of control shaft 110 will rock the master control ring and similarly rock whichever one of the control collars the dogs 172 are interlocked with. Pin 174 is long enough to maintain engagement with the dogs 172 whether they be interlocked with collar 150 or collar 160.

The control collars are loose on the tube 130 unless centered by the master control ring, there being coacting centering surfaces between ring and collars as indicated at 176.

In order that it may be interlocked with one or the other of the collars 150 or 160, the master control ring must be capable of an axial movement, and the axial movement is effected by the before-mentioned reverse slider to be described presently.

At the front end of the transmission casing there are forward and reverse-driving control collars and a master control ring corresponding to those on the rear end of the casing, just described, but differing in structure somewhat because of the reversed position of the control collars at one end with respect to those at the other end and the necessity of coupling both sets of collars at front and rear with the respective master control rings by a simultaneous movement of the automatically controlled slider in one sense of direction. The forward and reverse driving collars at the front end are retained in an axially fixed position by means similar to those that hold the corresponding collars at the rearward end from axial movement. The front end of tubular body 142 prevents movement rearward, and a stop ring 169 prevents movement forward.

Figure 8:
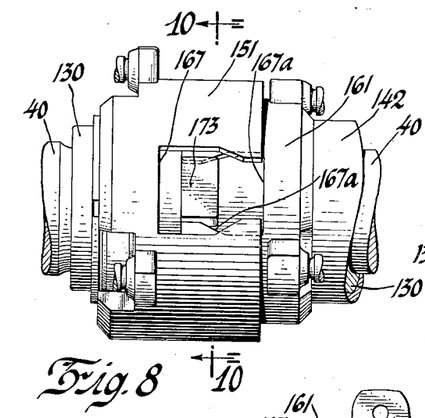
Figure 8 shows an assembly of control parts at the front end of the transmission mechanism.
Figures 10, 11, 12:
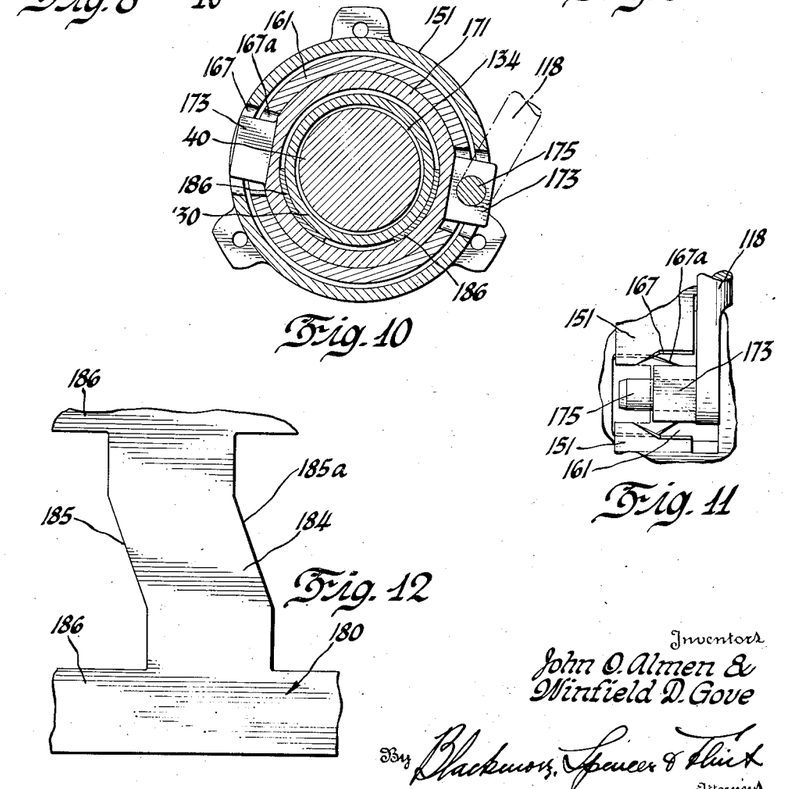
Figure 10 is a sectional view taken along the line 10—10 of Figure 8.
Figure 11 is a view of a fragment of the parts illustrated in Figure 8 looked at from the side opposite that which is exposed in said Figure 8, or as viewed from the right-hand side of Figure 10.
Figure 12 represents a development of the arched centrally disposed cam-contoured portion of the reversing slider shown in Figure 6.

At the front end of the casing the forward-driving control collar is indicated by numeral 151, and the reverse-driving control collar by numeral 161. Control collar 151 is link-connected to brackets on the backs of the carriers 80 and the control collar 161 is link-connected to brackets on the front faces of said carriers substantially as the corresponding collars at the rear end of the casing are connected to carriers 80a. Forward-driving control collar 151, however, overlaps or telescopes with reverse-driving control collar 161 as shown in Figures 1, 10 and 11, instead of having their edges substantially abutting as do collars 150 and 160. A deep notch 167 in collar 151 registers with a deep notch 167a in collar 161 as shown best in Figures 8 and 11. Master control ring 171 is slidable axially on tube 130 within control rings 151 and 161. Centering cam surfaces 177 are provided on master control ring 171 and on control collars 151, 161. Master control ring 171 has dogs 173 arranged diametrically opposite and so placed as to pass radially through the deep notches in the surrounding control collars 151, 161. One of the dogs 173 is perforated to receive a pin 175 rigidly joined to link 118. Pin 175 is long enough to allow the master control ring to interlock with either collar without disengaging the pin from the perforated dog. The notches 167, 167a in collars 151 and 161, unlike the notches 168, 168a in collars 150 and 160, are narrowest at their open ends and have oppositely inclined piloting guides flaring away from the parallel sides at the open ends into wider portions. Dogs 173 fit nicely into the parallel sided narrower ends of the notches in each collar but have a latitude of movement angularly about the axis in the wider portions of the notches. So, if a dog 173 is engaged in the narrower end of a notch 167a, as shown in Figures 8 and 11, a rocking movement of the master control ring will will angularly adjust the collar 161 and effect an adjustment of the rollers for reverse driving. But if a dog 173 is engaged in the narrow end of a notch 167 a rocking movement of master control ring 171 will adjust the collar 151 angularly and effect an adjusting of the rollers for forward driving. The wider portion of each deep notch provides sufficient lost motion for the dogs 173 when engaged in the narrower portion of the notch in one collar so that the other collar is not moved when said one collar is adjusted. The collar with which the dogs are not in operative engagement is loose and uncentered by the master control ring.

Axial movement of the master control rings 170 and 171 may be effected simultaneously by an axially movable member, hereinafter designated the reversing slider, sleeved over and slidable axially on frame-tube 130. The reversing slider is identified as a whole in the drawings by the numeral 180. Slider 180 consists of a mutilated tube having preferably complete ring-like ends 182, 182a and an incomplete tubular or arched central portion 184, the latter having parallel edges forming cam contours inclined to a plane normal to the axis as shown at 185 and 185a in Figures 1, 6 and 12. The tubular end portions and central arched portion are connected by straight, parallel-edged, guides 186, which fit in the aforesaid guideways 140 of the frame tube 130 as shown in Fig. 1. As also shown in Fig. 1 each ring-like end 182, 182a of the slider 180 fits in the annular channels 136, 136a respectively of frame tube 130 and has an annular external groove to receive an expansible, split elastic locking ring 188, or 188a. The locking ring 184 engages within an annular internal groove in master control ring 171 at the front end while locking ring 184a engages in a similar internal groove in master control ring 170 at the rear end thus forming a swivel connection between slider and master control rings. The arched central portion 184 of the slider partially encompasses the reduced midportion 138 of frame tube 130. The annular channel or space around said midportion 138 is of dimensions to permit axial movement of the arched part 184 of the slider. Slider 180 may be conveniently made from flat sheet material by stamping out an oblong shape having transverse ends connected by spaced parallel longitudinal strips bridged at the middle by a connecting strip having oblique edges, and bending the stamped shape around a mandrel or otherwise.

By means of the construction illustrated and described a rearward movement of slider 180 will shift master ring 170 rearward and cause the dogs 172 to interlock with forward-driving control collar 150, while at the same time shifting master ring 171 rearward causing the dogs 173 to interlock with the narrow portions of the notches in forward-driving control collar 151. A forward movement of the slider 180, will cause the dogs 172 of the rear master control ring 170 to interlock with reverse-driving control collar 160, and the dogs 173 of the front master control ring 171 to interlock with the narrow portions of the notches in reverse-driving control collar 161. In the rearward movement of the slider the forward-driving control collars are centered and locked and the rearward-driving control collars loosened and freed; and in the forward sliding movement the reverse-driving control collars are centered and locked and the forward-driving control collars are loosened and freed,—in both conditions by the centering cams and interlocking elements on master rings and control collars as described.

In accordance with this invention the slider 180 is automatically moved rearward, to set the controlling mechanism for forward-driving, in response to rotation of gear 60 and hub-like tube 62 counter clockwise as viewed from the left of Fig. 1, that is, at the beginning of a change from reverse to forward driving. The slider is moved forward in response to clockwise rotation of gear 60 and tube 62 as viewed from the left of Fig. 1, at the beginning of a change from forward to reverse-driving. Translation of the rotations of gear 60 and hub-like tube 62, at the time the sense of rotation of output shaft changes, into axial movement of slider 180 is effected by means now to be described.

Figure 7:
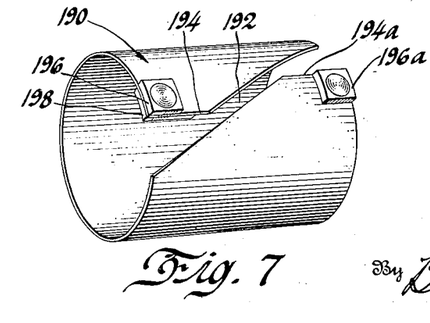
Figure 7 is a perspective view of the reversing slider actuator sleeve a fragment of which is shown in Figure 4.

A tubular body 190, herein designated the slider actuator sleeve, surrounds the central arched portion 184 of the slider 180 disposed within the wide channel 138 of frame tube 130 and constitutes a rockable camming device adapted to actuate slider 180. The sleeve 190 is preferably formed of sheet metal rolled or curled into tubular form with diagonal edges spaced apart to provide a diagonal fissure 192. One of the adjacent edges, however, is formed parallel to the axis at one end of the sleeve, while the opposite edge is formed parallel with the axis at the other end of the sleeve, as shown in Figure 7 at 194 and 194a. There is, therefore, a triangular space at each end of the diagonal fissure. On the convex surface of sleeve 190 at the corner formed by the edge 194 and the forward end of the sleeve is an abutment block 196 and at the corresponding corner formed by the edge 194a and the rearward end of the sleeve is an abutment block 196a. At the same corners, but on the concave surface of sleeve 190, are cam blocks 198 and 198a respectively. The cam edge 200 of cam block 198 is arranged to engage with the inclined edge or cooperating cam contour 185 on arched part 184 of the slider 180, while the cam edge 200a of cam block 198a is arranged to engage the inclined edge or cooperating cam contour 185a. The arched part 184 of the slider having the said inclined edges is of a width or axial extent to fit neatly between the cam edges 200, 200a, of the blocks 198, 198a on the inner surface of sleeve 190 which surrounds the central portion of the slider.

Figure 15:
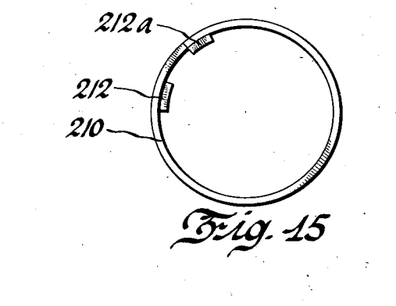
Figure 15 is a rear end view of a spring-coil reversing-clutch element.

Surrounding the sleeve 190 is a right-handed, reversing, spring clutch coil indicated as a whole by numeral 210. Secured to the inside—the concave side—of the spring coil at each end is a declutching trip, indicated by numeral 212 at the front end and by numeral 212a at the rear end (Fig. 15). The trip 212 is disposed within the triangular space at the forward end of sleeve 190 adjacent the blocks 196 and 198 and thickens that end of the spring so that it may effectively push against said blocks on the sleeve if caused to rotate counter clockwise viewed from the left of Figure 1, and so rotate sleeve 190 counter clockwise. Trip 212a is disposed within the triangular space at the rearward end of sleeve 190 adjacent the blocks 196a and 198a so that the rear end of the spring may effectively push against the blocks 196a and 198a if the spring is caused to rotate clockwise viewed from the left-hand end of Figure 1, and so rotate sleeve 190 clockwise. To effect collapse of the spring coil and cessation of its clutching action the other edges of trips 212 or 212a, that is, the inside edges opposite the described pushing edges, are adapted to contact with one or the other of two ground stops, which in the illustrated mechanism are the upper edges of the guides 186 on slider 180, as will presently appear. Spring coil 210 tends to expand enough to place the outer or convex surfaces of the coils in contact with the inner surface of the tubular member 62. It is therefore clear that if gear 60 and tubular member 62 be rotated counter clockwise (as viewed from the left of Fig. 1) the rearward or "teaser" end of the spring coil 210 will tend to uncoil and therefore to expand further since motion of the other end is resisted by the sleeve 190. Thus the coil becomes one element of an expansible friction clutch the other element being the tubular hub-like member 62. And when the gear 60 and tubular member 62 rotate counter clockwise when viewed from the left of Fig. 1, the front end of spring coil 210 will press against blocks 196 and 198 so that sleeve 190 will be rotated counter clockwise and the cam block 198 on said sleeve cooperating with the cam edge 185 on the slider will force the slider 180 rearward and set the forward-driving roller-control mechanism. If tubular member 62 is rotated clockwise, viewed from the left of Figure 1, the forward end of the spring, which is now the "teaser" end, will be expanded within the tubular member and the rearward end of the spring will press against the blocks 196a and 198a so that sleeve 190 will be rotated clockwise as viewed from the left of Fig. 1.

When, upon a change in the sense of rotation of the output shaft 40, the races, rollers, gear 60 and tubular member 62 also change, and the slider 180 has been shifted as far as it can be shifted in an axial direction, the coil clutch element 210 must be collapsed and declutched from the cooperating element, which is hub-like tube 62. Assuming that a change is made from reverse to forward driving and therefore that hub-like tube 62 begins to rotate counterclockwise viewed from the left of Fig. 1: Then the rearward coils become the tickler coils and become expanded into strong clutching contact with the inside of the hub-like tube and the forward end of the coil pushes against the blocks 196 and 198 of sleeve 190 rotating the latter counterclockwise. After about one-half a revolution more or less counterclockwise the end of the sprint 10 that carries the trip 212 will have rotated sleeve 190 far enough fully to engage the dogs of the master control rings with the notches of the forward-driving control collars, and the inside edge of trip 212a at the other end of the coil 210 will have come in contact with the upper edge of the guide 186 on the left-hand side of slider 180 as viewed from the left of Figure 1. This will cause the coil to contract and free it from clutching engagement with tube 62 until the sense of rotation is again changed. The operation in changing from forward driving to reverse is of course the same, the pushing end on the one hand and the tickling and tripping end on the other hand interchanging their functions.

Each time the output shaft (and coincidentally the gear 60) changes its sense of rotation the reversing clutch coil 210 will automatically actuate the slider actuator sleeve 190 so as to move the reversing slider 180 in the sense required to set the control mechanism properly according to whether the transmission is arranged for forward or rearward driving.

We claim:

1. In reversible friction race and roller transmission mechanism of the kind described, a roller carrier capable of moving to change the ratio position of its roller, two independently operatable mechanisms connected respectively to the carrier at opposite sides of the center plane of the roller, said mechanisms including ratio control collars angularly movable about the axis of the races, an axially and angularly movable master control device coaxial with said collars, interlocking means on said collars and said master control device, an axially movable member connected to the master control device for causing the latter to interlock with one or the other of said control collars depending upon the sense of movement of the axially movable member, actuating means for the latter, and external control means for rocking the master control device.

2. A combination as defined in claim 1 wherein guide means are provided for the axially movable member, and a swivel connection between said axially movable member and the master control device adapted to permit rotation of said control device relative to the axially movable member but prevent relative axial motion of said control device with respect to said axially movable member.

3. A combination as defined in claim 1 in which the master control device is a ring having an internal groove, and the axially movable member slides in guide means and carries a device engaging in said internal groove.

4. A combination as defined in claim 1 in which the master control device is a ring having an internal groove and the axially movable member slides in guide means and is provided with an external groove and a split elastic ring that engages the external groove of the axially movable member and the internal groove of the master control ring.

5. A combination as defined in claim 1 in which there is a guiding means, and in which the master control device has a swivel connection with the axially movable member, the latter consisting of a mutilated tube having parallel spaced guide members fitted to the guiding means, there being camming means whereby said mutilated tube may be actuated.

6. In reversible friction race and roller transmission mechanism of the kind described, a frame including a tube coaxial with the races, said tube having an annular exterior channel near one end and external longitudinal guideways; a roller carrier movable to change the ratio position of the roller mounted in it; two independently operatable mechanisms connected respectively to the carrier at opposite sides of the center plane of the roller, each mechanism including a ratio control collar angularly movable about the axis of said frame-tube; an axially and angularly movable master control ring sleeved on the frame-tube and bridging said annular external channel, said master control ring being surrounded by said collars; inter-locking devices on said collars and said master control ring; an axially slidable member having spaced longitudinal guide members slidable in the external guideways of said frame-tube, a ring-like part movable axially in said annular external channel, and a swivelling connection between said ring-like part of said slidable member and the master control ring.

7. A combination as defined in claim 6 in which the frame-tube coaxial with the races is provided also with a wide annular channel and said axially slidable member is equipped with an arched portion slidable within said wide annular channel and having cam edges, a rockable camming device engaging with the cam edges of said arched portion, and means for rocking said rockable camming device in contact with said cam edges.

8. In reversible double toric friction race and roller transmission mechanism having two power transmitting branches, a roller carrier for each branch of the transmission, each carrier being movable to change the ratio position of its roller; two independently operatable mechanisms connected with each carrier at opposite sides of the center plane of the rollers supported by said carrier, each of said mechanisms comprising a pair of ratio control collars angularly movable about the axis of the races; an axially and angularly movable master control ring disposed concentrically within each pair of control collars, the control collars for one carrier having abutting edges and opposed notches with flaring entrances; the control collars for said other carriers telescoping one another and having registering notches with narrow entrance ends, the walls of said notches flaring toward the closed ends thereof, dogs on said master control rings arranged to engage the notches in said collars, and axially movable means connected to both master control rings to move them simultaneously in order to interlock them with the appropriate collars.

9. A combination as defined in claim 8 with a central frame-tube reduced midway between its ends to form an annular channel and also reduced at each end to form narrower annular channels, the ends of said tube and said narrower channels extending within said control collars, said tube also having parallel guide grooves extending longitudinally therein; said axially movable means comprising a slider having an arched portion of less axial extent than the central groove of the tube and seated therein, said arched portion having its opposite edges inclined in parallel to constitute cams, the end portions of said slider being of ring-like form and slidable within the narrow channels of the tube, said ring-like ends of the slider having annular external grooves and split elastic rings occupying said grooves, said master control rings having corresponding internal grooves in which said rings are also engaged, and means cooperating with the cams to move the slider axially.

10. In reversible friction race and roller transmission mechanism of the kind described in which the rollers are capable of adjustment to different ratio positions, the combination of independently operatable adjusting mechanisms, respectively adapted to adjust the ratio position of the rollers during forward or reverse driving, each of said mechanisms comprising a control member, a rotatable and axially movable master control device, means whereby said master control device may be interlocked with either of said control members, a guiding means, an axially slidable member guided in said guiding means and swiveled to said master control device, an automatic means for moving the axially slidable member in one sense in response to a change of rotation of the transmission from forward to reverse and in the other sense in response to a change of rotation of the transmission mechanism from reverse to forward.

11. A combination as defined in claim 10 in which the automatic means for moving the axially slidable member in response to a change in sense of rotation of the transmission mechanism comprises: a clutch element positively rotatable with the transmission mechanism, a companion clutch element constructed to have an inherent tendency to engage and rotate with the positively rotatable clutch element, trip means to release the clutch after a partial rotation in either sense, a member rotatable with said companion clutch element, and means for converting the rotary movement of said rotatable member into an axial movement of said axially slidable member.

12. A combination as defined in claim 10 in which the automatic means comprises: a tubular member rotating in one sense or the other according to whether the transmission is operating in forward or reverse drive, said tubular member comprising one element of a clutch, a companion inner clutch element disposed within said tubular member and means tending automatically to engage the clutch in both senses of rotation of the tubular member, a rotatable sleeve engageable in both senses of rotation by the inner member of the clutch, means on said sleeve cooperating with said axially slidable member to convert the rotary movement of the sleeve into an axial movement of the slidable member, and means to trip the clutch and release the inner member from engagement with the outer member after a portion of a rotation in either sense of direction.

13. In reversible friction race and roller transmission mechanism of the kind described in which the rollers are capable of adjustment to different ratio positions, the combination of independently operatable adjusting mechanisms respectively adapted to adjust the ratio position of the rollers during forward or reverse driving, each of said mechanisms comprising a control element; a rotatable and axially movable master control device; interlocking means on said master control device and control elements; means for rotating said master control device, and means for moving it axially in response to a change in sense of rotation of the transmission mechanism in order to interlock it with one or the other of said control members; said means for moving said master control device axially comprising an axially movable member connected to said master control device; cams on said axially movable member; a clutch element rotatable positively with the transmission mechanism; a companion inner clutch element disposed within said positively rotatable clutch element, said companion clutch element constructed and arranged to have an inherent tendency to engage the positively rotatable clutch element; a sleeve within the companion clutch element; means whereby the sleeve may be rotated by said companion clutch element; trip mechanism to release the engagement between said clutch elements after a partial rotation in either sense of direction, and cams upon the sleeve engaging the cams upon the axially movable member.

14. A combination as defined in claim 13 in which the clutch actuated sleeve consists of an elastic sheet metal tubular element having a diagonal fissure with external clutch engaging elements at each end on opposite sides of the fissure and with cams disposed within the sleeve at positions corresponding to the positions of the clutch engaging elements.

15. A combination as defined in claim 13 wherein the companion inner clutch element consists of a spring coil having a trip at each end on the inside of the coil there being ground stops arranged to engage the trips after a portion of a revolution has occurred.

16. A combination as defined in claim 13 in which the companion inner clutch element consists of a spring coil having a trip at each end on the inside of the coil, and wherein there are ground stops on said axially movable member.

JOHN O. ALMEN.
WINFIELD D. GOVE.